Patented June 16, 1953

2,642,352

UNITED STATES PATENT OFFICE 2,642,352

CONTROL OF AQUATIC WEEDS

Arthur W. Swezey, Garden Grove, Calif., assignor to The Dow Chemical Company, Midland, Mich., a corporation of Delaware No Drawing. Application October 15, 1949,
Serial No. 121,644

4 Claims. (Cl. 71—2.3)

This invention relates to herbicides and is particularly concerned with a composition and method for killing aquatic plants. The expression "aquatic plants" as herein employed refers to vegetative organisms normally growing in water and in which the leaf and stem parts are largely submerged. The expression is inclusive of alga such as Chara spp. (stonewort), a vegetative organism with stem-like and whorled leaf-like structures; water plants which have no roots such as Ceratophyllum demersum (coontail); and rooted aquatic weeds such as Anacharis densa (waterweed), Vallisneria americana (tape grass), and Potamogeton pectinatus (pond weed).

Aquatic plants growing out of place are commonly considered weeds, and millions of dollars are expended annually for their control. In irrigation ditches, canals, rivers and streams, these plants hinder the flow of water, cause excessive sedimentation, result in high water loss from evaporation, and interfere with navigation. In ponds and lakes, they frequently develop such a dense growth as materially to limit the usefulness of such bodies of water for either recreational or commercial purposes. Mechanical operations, such as dredging, chaining, burning and mowing have heretofore been the principal means of control. More recently efforts have been made at chemical control. The shortcomings of the latter methods have included the superficial burning of exposed leaves without the killing of roots so as to permit the quick regrowth of the plants, the poisoning of the water so as to make it unsuited for irrigation purposes, and specificity of action against certain species only, thus leading to increased growth activity on the part of unaffected plant growth. The desirability of an improved control measure appears evident.

According to the present invention, it has been discovered that heptachlorocyclohexane products consisting principally of 1,1,2,3,4,5,6-heptachlorocyclohexane are very toxic to aquatic plants. When such a compound, or a composition in which it is employed, is introduced into the water adjacent to the submersed portions of aquatic plants, a quick kill of the stems and leaves results, accompanied by the control in a short period of time of the roots. The preferred embodiments of the invention include (1) the method as outlined and (2) a water dispersible liquid herbicide concentrate comprising 1,1,2,3,4,5,6-heptachlorocyclohexane as a principal active toxic ingredient.

The preparation of 1,1,2,3,4,5,6-heptachlorocyclohexane is reported in U. S. Patent No. 2,010,841, issued August 13, 1935. Other literature describes two isomers of heptachlorocyclohexane, i. e. the alpha isomer melting at 146° C. and the beta isomer melting at 260° C. The heptachlorocyclohexane employed in accordance with the present invention is to mixture of isomers along with small amounts of hexachlorocyclohexane and possibly pentachlorocyclohexane. The product as employed is a wax-like crystalline solid having a melting range of 53°–120° C., containing 74.66 per cent by weight of chlorine, and characterized by a chloroaromatic odor. It is prepared by adding monochlorobenzene to an excess of liquid chlorine at atmospheric pressure and under the influence of light. The addition of the chlorobenzene to the liquid chlorine is accomplished portionwise at room temperature with agitation, and the resulting crude product is degassed by heating to 95° C. for a period of time sufficient to drive off excess and unreacted chlorine. In the following specification, examples, and claims, the described 1,1,2,3,4,5,6-heptachlorocyclohexane product, for convenience is referred to as heptachlorocyclohexane.

The advantages accruing to the new composition and to the application of the same for control of aquatic weeds are many. The rapidity of action is in striking contrast to many other herbicide products which frequently require up to several weeks or more to accomplish control of vegetation. Also, the versatility of action against aquatic growths is advantageous in that it permits the simultaneous control of many different kinds of plants whether narrow or broadleaf, and of all plant parts including roots. In previous operations with known herbicidal materials, against mixed stands of undesired vegetation, the killing of one type of plant frequently has encouraged the growth of unaffected plants so as to vitiate the initial results and necessitate multiple treatments with attendant inconvenience and expense. The matter of economy of operation is also of importance. The toxicant material here employed is relatively inexpensive, easy to handle, and effective at very low dosages. All of these features contribute to the usefulness and desirability of the present development. Also, the presence of small amounts of heptachlorocyclohexane in the water and on dead plant residues do not present a problem with respect to subsequent utilization of the water in agricultural operations such as irrigation. The tolerance of all crop plants for water containing heptachlorocyclohexane has not been exactly determined, but it has been found, for example, that the diversion of the water from a treated irrigation ditch into the water of an untreated ditch generally accomplishes sufficient dilution that the water can be safely used on most desirable plant species.

A further advantage in the invention resides in the wide range of water temperatures over which the method is operable. Thus the treatment can be carried out at almost any water temperature which will permit the growth and development of aquatic plants to the point where they become a nuisance.

The compositions of the present invention are preferably liquid concentrates in which the heptachlorocyclohexane is associated with (1) a dispersing and emulsifying agent and (2) a mutual solvent for the toxicant and emulsifying agent. The balanced composition contains sufficient of the solvent to prevent the separation of toxicant and emulsifying agent in the concentrate, and sufficient emulsifying agent to make the composition self-dispersing in water to give a milky dispersion which thereafter breaks to permit the settling out of the solution of the heptachlorocyclohexane in the form of small water-immiscible droplets. Also, such composition should be characterized by a density only slightly greater than water.

The expression "dispersing and emulsifying agent" as herein employed refers to one or a combination of complex organic derivatives of the type identified as sulphonic acids, polyesters, polyethers, ether esters, ether alcohols, abietic acid-containing complexes, naphthenates, and certain salts of such compounds which have a relatively high solubility in organic liquids. Illustrative of materials which may be so employed are alkyl-aryl sulphonic acids, alkali metal rosinates, alkali metal naphthenates, sodium alkyl-aryl sulphonates, sorbitol long-chain fatty acid esters, polyalkylene derivatives of sorbitol long-chain fatty acid esters, polyalkylene oxides, and polyalkylene oxide derivatives of phenolic structures. These materials are as described in "Emulsion Technology," second edition, pages 329-346, published 1946 by Chemical Publishing Company, Brooklyn, New York. The proportion of such agent employed is not critical provided only that the dispersing action be accomplished. Generally, from about 5 to 20 per cent by weight of the total composition is sufficient depending upon the particular agent selected.

The expression "mutual solvent" is inclusive of such materials as cyclohexanone, benzene, xylene, isopropyl benzene, hexalin, cresylic acid, isopropyl naphthalene, toluene, various petroleum distillates and the like. Here again, the proportion may vary widely provided the required solvent and carrier action be supplied. In practice, from about 50 to 90 per cent of such solvent has been found to give desirable results.

Other constituents adapted to be employed in the mixtures include the mono-, di-, and tri-chlorobenzenes, liquid chloronaphthalenes, and chlorinated alkylbenzenes. Here again, the limiting factors on the ultimate mixture include the indicated characteristics of density and dispersibility in water.

The porportion of heptachlorocyclohexane in the ultimate liquid concentrate composition may vary from about 3 to 40 per cent or higher and is largely determined by the solubilities and compatabilities of the various constituents in the composition.

The liquid compositions are readily prepared by mixing and warming the several constituents. The resulting concentrate should be a mobile liquid adapted to be sprayed or otherwise distributed in conventional apparatus. It has been found advantageous to mix such product with approximately an equal volume of water shortly before application. This permits improved distribution of the toxic ingredient, and facilitates dispersion of the ultimate mixture in the water.

An alternative mode of compounding includes the dispersion of the heptachlorocyclohexane in a finely divided carrier such as diatomaceous earth, pyrophyllite, clay, or fuller's earth to form a wettable powder. In such mixture, the heptachlorocyclohexane may constitute from 5 to 95 per cent by weight of the ultimate composition, and such wetting and dispersing agents, organic solvents, or supplementary toxicants may be included as may appear desirable. The production of such wettable powders is readily accomplished by simply grinding the materials together. Alternatively, the heptachlorocyclohexane and other constituents may be dissolved in a suitable organic solvent and the finely divided carrier wet with the solution. The solvent may or may not be recovered by evaporation as desired.

The method of the present invention contemplates the application of the described materials to any pond, lake, river, stream or ditch where submersed aquatic plants are a problem. However, the effective ingredient has been found sufficiently toxic to fish and other marine animal life, that the preferred embodiment is the treatment of drainage and irrigation ditches where the conservation of fish life is not critical. In instances where it is desired not only to control vegetation but also to eliminate fish and other water life as in the poisoning of trash fish to permit restocking, the treatment of lakes and ponds is strongly recommended. It should further be pointed out that the treatment has not proven completely satisfactory against water hyacinth, although at 500 parts of the toxicant per million parts of water a considerable control is obtained upon the leaves and stems of the plant and the roots and bulblets exhibit some effect of treatment.

In general, the method of the present invention comprises the killing of aquatic plants by dispersing into the water adjacent to the submersed portions of the plants a lethal concentration of heptachlorocyclohexane. Any suitable formulation of heptachlorocyclohexane may be employed in ponds or lakes, with the water-dispersible liquid concentrates preferred in the treatment of streams, ditches or other moving water.

The application may be made at any suitable water temperature but preferably above 50° F. In ponds or other standing water, minimum operable concentrations range between about 25 and 200 parts of toxicant per million parts of water, depending upon plant species, plant mass, water temperature, exposure time, and other conditions of operation. In moving bodies of water, minimum concentrations should be from 50 to 2000 parts of toxicant per million parts of water, again depending upon operating conditions and plant species concerned. Preferred range of concentrations is from 100 to 500 parts per million. At exposure times of one-half hour and one hour, minimum concentrations of 500 and 250 parts per million, respectively, have been found to give good results.

In application, the object is to provide a relatively uniform dispersion of a lethal concentration of the toxicant in the water adjacent to the undesired plant growth and for an exposure time sufficient to cause the death of the vegetation. This is readily accomplished by spraying or dispersing the described concentrate compositions just under the surface of the water and directly above the plant mass so as to accomplish their dispersion and thereafter permitting the toxicant to settle onto the plant surfaces and into the stream or pond bottom about the plant roots. Application may also be made by spraying or sprinkling on the water surface. With the liquid compositions, application may be made with a pump and spray boom assemblage so that the ejected spray or stream of the composition is placed at a point below the surface of the water and just above the vegetation, the expulsion of the concentrate from the orifices of the boom being under such pressure as to accomplish the relatively uniform dispersion of the concentrate in the water. Alternatively, the composition may be sprayed over the surface of the water with sufficient force to accomplish dispersion of the concentrate to form a milky blanket which slowly settles through the water and onto the plant surfaces. With the wettable powders, the composition is dusted on the surface of the water with sufficient agitation to insure wetting and dispersion.

In streams, ditches, or other moving water, the feet of flow per second is a determining factor in the amounts employed and exact mechanics of application. Here, the toxic composition is introduced into the water preferably at some distance upstream from the vegetative growth, and a blanket of the diluted toxicant caused to flow into and over the area of plant growth for the necessary exposure time. In this embodiment of the invention, the milky coloration imparted to the water by dilution of the liquid concentrate is most advantageous. Thus, the concentrate may be flowed, dripped, sprayed, or otherwise metered into the stream of water and the progress and persistence of the toxicant determined by visual inspection. A convenient mode of operation includes introducing the concentrate by knap-sack sprayer below the surface and preferably to the lower level of the water. As the milky dispersion of toxicant moves down the stream its exact position can be observed and additional material introduced as desired. By observation of the intensity of the cloudy dispersion, the concentration of toxicant can be closely estimated. A convenient technique includes positioning a bright metal disc below the surface of the stream and adjacent to the vegetation under treatment. When the turbidity of the water attributable to the presence of dispersed heptachlorocyclohexane is low so as clearly to reveal the disc, additional concentrate may be employed.

Among the submersed aquatic weeds which may be controlled with the described composition and method are water star grass (*Heteranthera dubia*), horned pondweed (*Zannichellia palustris*), and milfoil (*Myriophyllum spp.*).

The following examples illustrate the invention but are not to be construed as limiting:

EXAMPLE 1

25 parts by weight of heptachlorocyclohexane was dissolved in 23 parts of acetone and this solution diluted with 48 parts of methanol and 4 parts of a commercial dispersing and emulsifying agent marketed as Nopco EUT and identified as alkyl aryl sulfonate. The resulting herbicidal concentrate was sprayed with mild agitation on the surface of the water in several tanks containing a vigorous growth of coontail (*Ceratophyllum demersum*) a free-floating plant with no roots. The amounts of concentrate employed were such as to give concentrations of 100, 200 and 400 parts per million of heptachlorocyclohexane per million parts of water. The plants were exposed to the action of the herbicide for one hour and the tanks thereafter drained, flushed, and refilled with fresh water. The degree of plant kill and the tendency of the treated plants to disintegrate was observed after 80- and 144-hour intervals. The water temperature was 60°–70° F. throughout the operation. The following table sets forth the results obtained:

*Table 1*

| Parts of Heptachlorocyclohexane per Million Parts of Water | Plant Toxicity Rating after— | | Plant Disintegration Rating after— | |
|---|---|---|---|---|
| | 80 hrs. | 144 hrs. | 80 hrs. | 144 hrs. |
| 100 | 75 | 100 | 33.3 | 100 |
| 200 | 75 | 100 | 33.3 | 100 |
| 400 | 75 | 100 | 100 | 100 |
| Emulsifier check at 400 | 0 | 0 | 0 | 0 |
| Untreated check | 0 | 0 | 0 | 0 |

In the foregoing and subsequent operations the "plant toxicity rating" is based upon percentage color loss and careful examination of the plant parts. The "plant disintegration rating" is based upon the tendency of the treated plant to shatter. A rating of 100 indicates that the stems and leaves become thoroughly disjointed upon slight agitation. The "emulsion check" is a determination in which the plants were treated with a composition containing all of the mutual solvents, dispersing and emulsifying agents, and other additaments in the original herbicide concentrate in the proportions indicated, but omitting the heptachlorocyclohexane.

EXAMPLE 2

In a similar operation, heptachlorocyclohexane was employed for the control of water-weed (*Anacharis densa* (Planchon)). This plant is the Elodea used in aquaria.

The concentrate employed was obtained by mixing together 25 parts by weight of heptachlorocyclohexane, 25 parts of benzene, 4 parts of hexalin, 10 parts of an alkyl aryl sulfonate marketed as "Oronite Sulfonate No. 5," and 36 parts of potassium salt of rosin, marketed as "Dresinate 90." This composition was dispersed through the water of a tank containing a vigorous growth of water-weed, the amount employed being such as to give a concentration of 200 parts of the heptachlorocyclohexane per million parts of water. The exposure time was 1 hour, at the end of which time the tank was flushed and filled with fresh water. Examination of the treated plants was made from time to time. After intervals of 96 and 192 hours the toxic rating exhibited by the plants on over-all examination was 75 and 92.5 per cent, respectively. These figures are predicated upon almost complete chlorophyllous color loss of the leaves, although the stems had retained a degree of their normal appearance. After a 264-hour interval, the stems were examined separately and the percentage control found to be approximately 87.5 per cent,

EXAMPLE 3

10 parts by weight of heptacholorocyclohexane was dissolved in 40 parts of benzene. To this solution was added 4 parts of hexalin, 10 parts of Oronite Sulfonate No. 5, and 36 parts of Dresinate 90. The mixture was warmed and stirred to obtain a water-dispersible herbicide concentrate.

The foregoing concentrate was employed to kill a dense growth of Chara spp. in fresh water. In this determination, the water of a tank containing a heavy growth of the Chara spp. was treated with sufficient of the herbicide composition to provide a heptachlorocyclohexane concentration of 50 parts by weight per million of water. This was accomplished by pouring the required amount of the concentrate on the surface of the water with mild agitation. The addition of the concentrate caused the formation of a milky surface layer which gradually settled through the water. One hour after application of the herbicide, the tank was drained, flushed, and filled with fresh water. 120 hours later the plant growth was examined and 90 per cent mortality observed based on color change. The "plant disintegration rating" (as described in Example 1) was 100.

A check tank to which no heptachlorocyclohexane was applied showed all plants growing vigorously at the end of the 120-hour interval.

EXAMPLE 4

The composition of Example 1 was employed at 500 parts per million against *Ceratophyllum demersum* to determine the effect of water temperature and interval following a fixed exposure time, upon the effectiveness of the treatment. In this operation, a number of tanks containing free-floating coontail plants were treated at a water temperature of 69° F. with sufficient of the concentrate to give a concentration of 100 parts of heptachlorocyclohexane per million parts of water. The application was made by diluting the concentrate with approximately an equal volume of water, and spraying the resulting dispersion on the water surface. One hour after application, each tank was drained, flushed and filled with fresh water. The several tanks were then stored under different conditions of temperature and the treated vegetation examined at intervals to determine "plant toxicity rating" and "plant disintegration rating." The following table sets forth the results obtained:

*Table 2*

| | Plant Toxicity Rating | | | | Plant Disintegration Rating at 144 Hours |
|---|---|---|---|---|---|
| | 24 Hours | 48 Hours | 72 Hours | 144 Hours | |
| Mean 81° F. (range 63-99° F.) | 37.5 | 57.5 | 77.5 | 92.5 | 100.0 |
| Check | 0 | 0 | 0 | 0 | 0 |
| Emulsifier check | 0 | 0 | 0 | 0 | 0 |
| Mean 70° F. (range 60-80° F.) | 30.0 | 55.0 | 77.5 | 95.0 | 100.0 |
| Check | 0 | 0 | 0 | 0 | 0 |
| Emulsifier check | 0 | 0 | 0 | 0 | 0 |

The check determinations were tanks in which all conditions and operations were duplicated except for the addition of the herbicide concentrate. The emulsifier check determinations were tanks treated with an amount of emulsifier and solvent exactly equivalent to the amount of these ingredients present in the tanks treated with the heptachlorocyclohexane concentrate, and under identical conditions with those previously described for the latter.

EXAMPLE 5

The concentrate composition as described in Example 3 is employed in the treatment of a small reservoir infested with water-weed, *Anacharis densa*. The herbicide is applied through the orifices of nozzles distributed along a boom connected by a hose with a small power spray rig consisting of a gear pump and gasoline engine, the apparatus being mounted in a rowboat. The composition is expelled from the boom at a level about 1 foot from the tops of the weeds and at least 4 inches below the water surface. Only the reservoir margins, the area of the weed growth and of an average 2-foot water depth, are treated.

The concentrate is introduced into the water in such amount as to give a toxicant concentration of 200 parts per million in the areas treated. Following treatment, the outlet of the reservoir is closed for two days, after which it is opened. An interval of at least 48 hours is normally required for the water-weed to lose color and appear dead, and at the end of 96 hours, disintegration will have commenced.

EXAMPLE 6

In a similar fashion and using the apparatus described in the preceding example and the composition of Example 3, an irrigation ditch heavily grown up with Sago pondweed, *Potomageton pectinatus*, is treated with heptachlorocyclohexane for the control of the pondweed in order to restore the ditch to its full water-carrying capacity. The ditch is characterized by a 15 cubic foot per second flow and a stream velocity of 10 feet per minute to give an actual flow of 675 gallons per minute. The herbicide is applied directly to the surface of the water at a treating point 300 feet upstream from the congested area and at a rate to give a concentration of 500 parts of the toxicant per million of water for a one hour exposure time over the weedy section. At a point downstream where the milky blanket of the emulsion has been lessened in concentration, more herbicide is added to bring the toxicant up to its original strength. The necessity and desirability for such addition is determined by lowering a metal disc into the water and comparing its visibility to a check area of known toxicant concentration. The treated water of the ditch is disposed of by dilution into a larger ditch before being used for irrigation. Within a few days, the pondweeds become brown in color, start to disintegrate and settle to the ditch bottom.

EXAMPLE 7

Tomato, radish, cauliflower, cabbage, sweet Spanish onion, parsnips, spinach, kidney bean, squash, pea, pepper, carrot, sugarbeet, milo, Punjab flax, and sweet corn seeds were planted in well fitted and drained seed beds. When the seedlings were seven weeks old, furrows were made immediately adjacent to the seed rows and the plant stands irrigated with water containing heptachlorocyclohexane at a concentration of 250 parts per million. The heptachlorocyclohexane was supplied as a water dispersible liquid concentrate as described in Example 3. Three weeks following irrigation, the plantings were inspected and found not to have been injured by the treatment.

I claim:

1. A method for controlling aquatic plants which includes the step of introducing into the water adjacent to the submersed portions of the plants a water-dispersible concentrate comprising as a toxic ingredient 1,1,2,3,4,5,6-heptachlorocyclohexane.

2. A method for killing the leaves, stems and other submersed parts of aquatic plants which includes the step of introducing into the water adjacent to the plant a water-dispersible herbicide comprising as a toxic ingredient 1,1,2,3,4,5,6-heptachlorocyclohexane, the proportion of toxicant in the concentrate and the dosage employed being such as to provide a lethal concentration of the heptachlorocyclohexane in contact with the plant surfaces.

3. A method for killing the submersed portions of aquatic plants which includes the step of dispersing into the water adjacent the plants a lethal concentration of 1,1,2,3,4,5,6-heptachlorocyclohexane.

4. A method for killing aquatic plants which comprises dispersing in the water adjacent to the plants a minimum of 100 parts per million of 1,1,2,3,4,5,6-heptachlorocyclohexane, and maintaining the submersed portions of the plant in contact with the dispersed heptachlorocyclohexane for a sufficient period to permit the action of the toxicant on the plant.

ARTHUR W. SWEZEY.

References Cited in the file of this patent

UNITED STATES PATENTS

| Number | Name | Date |
| --- | --- | --- |
| 1,996,353 | Seydel | Apr. 2, 1935 |
| 2,110,842 | Ressler | Mar. 8, 1938 |

FOREIGN PATENTS

| Number | Country | Date |
| --- | --- | --- |
| 573,712 | Great Britain | Dec. 3, 1945 |
| 740,232 | France | Jan. 23, 1933 |

OTHER REFERENCES

Manufacturing Chemist, February 1946, page 70.

Water Works and Sewerage, July 1938, pp. 688 to 690.

Water Works and Sewerage, May 1940, page 231.

Specimen label in file of "Benochlor" trademark, No. 363,600, registered January 3, 1939.